No. 696,062. Patented Mar. 25, 1902.
M. W. MARSDEN.
BUILDING MATERIAL.
(Application filed Aug. 23, 1900. Renewed Feb. 18, 1902.)
(No Model.) 2 Sheets—Sheet 1.
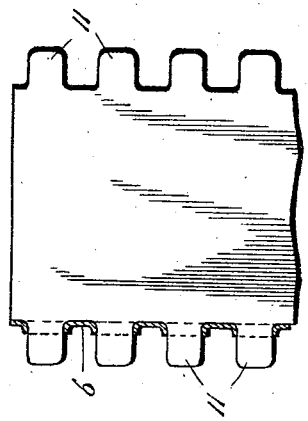
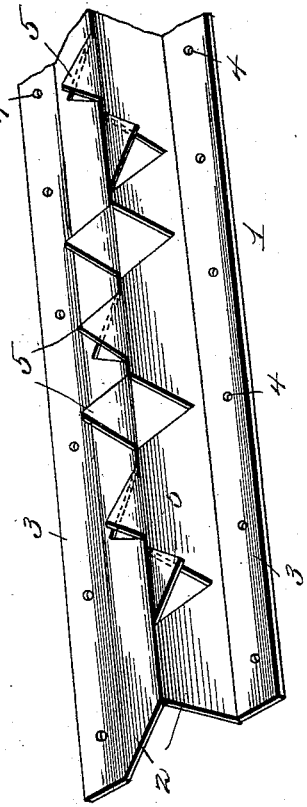
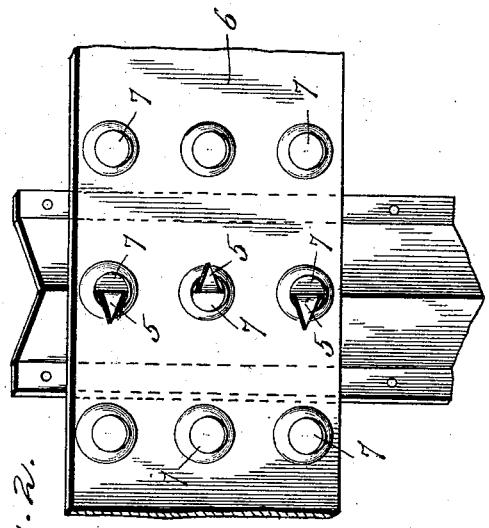
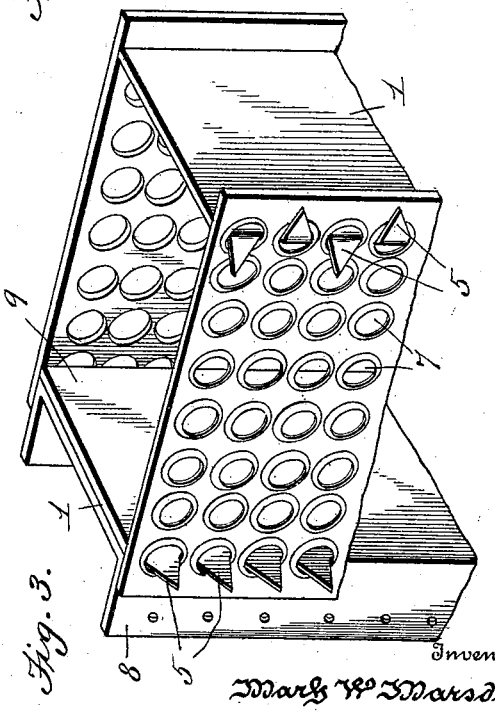

No. 696,062. Patented Mar. 25, 1902.
M. W. MARSDEN.
BUILDING MATERIAL.
(Application filed Aug. 23, 1900. Renewed Feb. 18, 1902.)
(No Model.) 2 Sheets—Sheet 2.
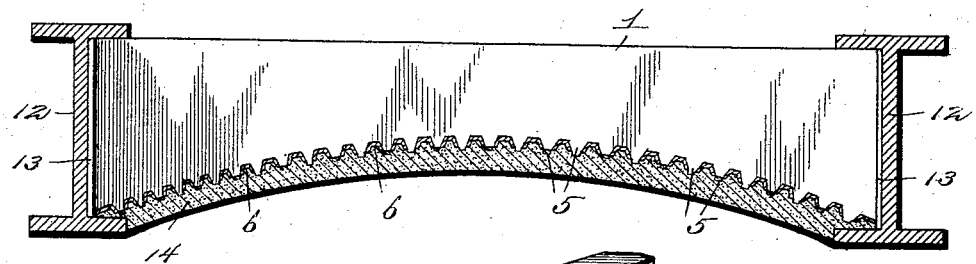
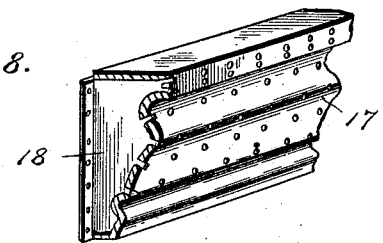
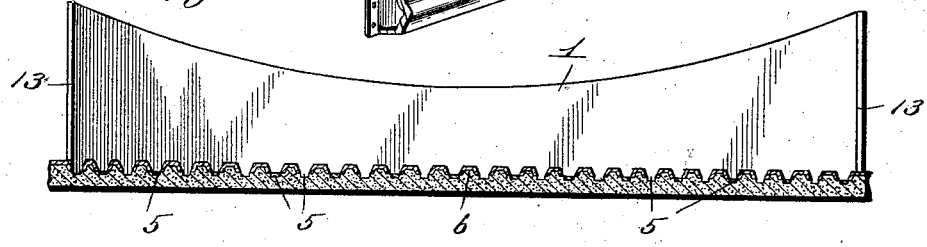
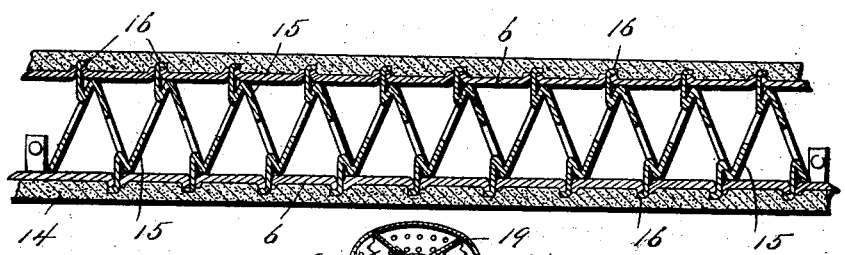
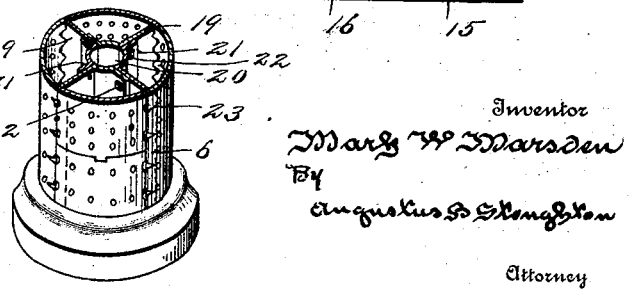
Witnesses
E. W. Hart
Jas. A. Richmond
Inventor
Mary W. Marsden
By
Augustus B. Stoughton
Attorney

UNITED STATES PATENT OFFICE.

MARK W. MARSDEN, OF PHILADELPHIA, PENNSYLVANIA.

BUILDING MATERIAL.

SPECIFICATION forming part of Letters Patent No. 696,062, dated March 25, 1902.

Application filed August 23, 1900. Renewed February 18, 1902. Serial No. 94,677. (No model.)

*To all whom it may concern:*

Be it known that I, MARK W. MARSDEN, a citizen of the United States, residing at Philadelphia, in the county of Philadelphia and State of Pennsylvania, have invented certain new and useful Improvements in Building Material; and I do hereby declare the following to be a full, clear, and exact description of the invention, such as will enable others skilled in the art to which it appertains to make and use the same.

The object of the invention is to provide a fireproof material suitable for building purposes which shall be comparatively inexpensive, strong, easily erected, and well adapted for the purpose, the present invention embodying certain improvements in the material described in Letters Patent No. 654,905, granted to me July 31, 1900.

The nature, characteristic features, and scope of the invention will be more readily understood from the following description, taken in connection with the accompanying drawings, forming a part hereof, in which—

Figure 1 is an elevational view of a portion of a tie or distance piece constructed in accordance with my present invention. Fig. 2 shows the same in its application as a support for my improved perforated building-plate. Fig. 3 is a detail showing the mode of attachment to an angle-iron. Fig. 4 is a sectional detail showing the distance-piece slightly modified in respect to its projections. Fig. 5 is a sectional view of an arched ceiling embodying my improvements. Fig. 6 is a similar view of a plane or flat ceiling. Fig. 7 is a sectional view of a partition embodying a still further modification of the intervening support or distance-piece. Figs. 8 and 9 are details, the former showing an adaptation of my improved tie or distance piece in connection with a cornice and the latter illustrating a fireproof construction for a pillar or column.

Referring to Fig. 1, 1 indicates a distance or tie piece consisting of an elongated strip of sheet metal having a raised or fluted middle portion consisting of inclined planes 2, which terminate in the flanged edges or projections 3, for attachment to a medium of support—for instance, by penetrating the said edges with apertures 4 for the passage of suitable fastening devices. The V-shaped member or fluting, which is formed by the inclined strips 2, is provided with a number of tangs 5, struck up from either side in alternate arrangement, so that the member is provided with a serrated edge, as it were. The tangs 5 are shown as being V-shaped; but I do not limit myself to this special form, same being shown merely as an example. They are useful in securing the perforated building-plates described in my patent aforementioned, Fig. 2 showing the mode of application, where 6 indicates the plate and 7 the perforations thereof, through which are passed the tangs 5, which are bent down over the flanges of the perforations, as shown.

In Fig. 3, 8 indicates an angle-iron against which the tie-piece 1 may simply abut or be secured by bolts, rivets, or the like. A number of these intervening strips or tie-pieces will be employed in a partition to properly space the plates, and the space 9 may be filled with any suitable incombustible material, if desired. The tie-pieces are here provided with tangs, as 5, which project through the perforations of the plates, as shown at left-hand section of figure, and are then bent over to secure the perforated plates, as shown at the right-hand section.

In Fig. 4 I show a tie or distance piece consisting of a flat strip of sheet metal provided on its lateral edges with projections 11, which are rounded or blunt at their extremities.

In Fig. 5 I have illustrated a simple structure for an arched ceiling or the like. The distance-piece here assumes the form of an arched member and is supported at its ends upon the I-beams 12 and may have the flanges 13. 6 denotes the plates held to place by the tangs 5, passed through some of the perforations and bent over to clench the plates. 14 denotes plaster or the like material.

Fig. 6 shows a means for converting an arched ceiling into one of flat surface. Same consists of a flanged tie-piece 1, with its top edge curved inward to coincide with the shape of the original structure, so as to fit snugly thereagainst. The opposite or lower edge is provided with serrations 5, all in a common plane, which serve to hold the perforated plates 6 to place.

In Fig. 7 is represented a partition embodying a tie-piece, consisting of an elongated strip of sheet metal folded upon itself to provide a number of V-shaped members 15, from which are struck up tangs 16, which are adapted to penetrate and engage the perforations in the plates 6. These tangs may be straight members or they may be pointed, as shown in Fig. 2, or provided with rounded or blunt edges, as shown in Fig. 4.

In the construction Fig. 8, 17 indicates the perforated building plate or plates made up into a cornice, and 18 indicates the flanged support.

In Fig. 9 I have illustrated a fireproof construction for a pillar or column. This may be built up as a skeleton frame in the manner shown, or it may be filled with any suitable incombustible material, or the distance-pieces 19 may be arranged radially of a post or similar body which may occupy the space 20 formed by the flanges 21, the distance-pieces being secured together in any well-known manner—for instance, as represented at 22. The perforated plates 6 are mounted upon the distance-pieces in the manner described in my patent aforementioned and retained by the tangs or serrations 23.

It will be obvious to those skilled in the art to which the invention appertains that modifications may be made in detail without departing from the spirit and scope of the same. Hence I do not limit myself to the precise construction and arrangement of parts hereinabove set forth, and illustrated in the accompanying drawings; but,

Having thus described the nature and objects of the invention, what I claim as new, and desire to secure by Letters Patent, is—

1. In a wall, ceiling, partition or like construction, the combination with plaster-sustaining means, of supports for said means comprising tie or distance pieces equipped with flanges and provided with serrations or tangs which extend in opposite directions to one another and engage said plaster-sustaining means, substantially as described.

2. A tie or distance piece consisting of a folded plate of sheet metal equipped with flanges and having serrations or tangs extending beyond its folded portion in opposite relation, substantially as described.

3. A tie or distance piece consisting of a folded plate of sheet metal having serrations or tangs projecting beyond its folded portion, in opposite arrangement, substantially as described.

4. A tie or distance piece consisting of sheet metal fluted to provide a support, the fluted portion or support being provided with tangs or serrations arranged in opposite relation, substantially as described.

5. A ceiling, wall or like construction consisting of flanged tie or distance pieces having oppositely-disposed serrations or tangs, and supports for said pieces, in combination with perforated plates penetrated and secured by said serrations or tangs and adapted for the reception of plaster, substantially as described.

6. A ceiling, partition or wall consisting of fluted tie or distance pieces having serrations or tangs struck up from their fluted portions, which project in opposite directions, and supports for said pieces, in combination with perforated plates attached to said serrations and adapted for the reception of plaster, substantially as described.

In testimony whereof I have signed my name hereto in the presence of two subscribing witnesses.

MARK W. MARSDEN.

Witnesses:
W. J. JACKSON,
K. M. GILLIGAN.